June 30, 1959 F. D. PARKER ET AL 2,892,666

ECHO RANGING RECORDING APPARATUS

Filed March 10, 1955

4 Sheets-Sheet 1

INVENTOR.
FREDERICK D. PARKER
LOUIS R. PADBERG JR.
BY George Lipkin
George E. Pearson
ATTORNEYS INVENTOR.
FREDRICK D. PARKER
LOUIS R. PADBERG JR.
BY George Sipkin
George E. Pearson
ATTORNEYS

ECHO RANGING RECORDING APPARATUS

Filed March 10, 1955 4 Sheets-Sheet 3

INVENTOR.
FREDERICK D. PARKER
LOUIS R. PADBERG JR.
BY George Sipkin
George E. Pearson
ATTORNEYS June 30, 1959 F. D. PARKER ET AL 2,892,666

ECHO RANGING RECORDING APPARATUS

Filed March 10, 1955 4 Sheets-Sheet 4

INVENTOR.
FREDERICK D. PARKER
LOUIS R. PADBERG JR.
BY George Sipkin
George E. Pearson
ATTORNEYS

United States Patent Office 2,892,666

Patented June 30, 1959

2,892,666

ECHO RANGING RECORDING APPARATUS

Frederick D. Parker and Louis R. Padberg, Jr., San Diego, Calif.

Application March 10, 1955, Serial No. 493,586

6 Claims. (Cl. 346—17)

(Granted under Title 35, U.S. Code (1952), sec. 266)

The invention described herein may be manufactured and used by or for the Government of the United States of America for governmental purposes without the payment of any royalties thereon or therefor.

The present invention relates to a recorder and more particularly to an apparatus for producing a permanent record of information derived from an echo ranging system and for controlling other display devices of such system.

There are known range recorders wherein a stylus is pulled across moving paper by means of a string and magnetic clutch assembly. In such an arrangement proper pressure and uniform movement of the stylus is difficult to obtain. A switch for keying associated equipment was operated by a contact on the stylus carriage and constituted a frequent source of difficulty because of the uncertain movement of the stylus. These recorders provide no accurate means for reading the range of a selected record portion, fail to provide means for selecting a desired record portion for additional presentation in other displays and fail to provide any time indications on the record. With a change of range scales the relative speed of paper movement and stylus movement would change whereby the spacing of successive record lines varied with different scales.

The recorder of the present invention comprises a movable recording paper, a fixed timing stylus, an endless carrier mounting a plurality of styli for movement across the paper, driving means for moving the paper and carrier at a fixed ratio of predetermined speeds, and a cam operated switch coupled with the driving means for keying associated equipment. A plurality of range scales, means for changing the speed of the driving means and a scale switch for controlling the range scale of an associated display device are all arranged to be simultaneously controlled by a single control element. A range cursor is movably mounted adjacent the styli traverse and is arranged to simultaneously control a plurality of associated displays and the range indication of the selected range scale.

It is an object of this invention to provide a recorder having an accurate and positive drive for a plurality of successively traversing styli.

Another object of this invention is the provision of an improved stylus carriage.

Still another object of this invention is to provide a recorder responsive to different range scales wherein successive record lines are equally spaced regardless of the chosen scale.

A further object of the invention is the provision of means for indicating the time of an echo ranging record.

Another object of this invention is to provide a range scale control for a recorder which is operable to simultaneously control the scale of the recorder, to provide a clear indication thereof and to adjust the scale of an associated display.

Still another object of this invention is the provision of a range indicator for a recorder which is connected to control the range of a plurality of associated displays while providing a positive indication of the selected range.

A further object of this invention is to provide improved recorder actuated switch operators for control of associated displays.

Other objects and many of the attendant advantages of this invention will be readily appreciated as the same becomes better understood by reference to the following detailed description when considered in connection with the accompanying drawings wherein.

Similar elements in the drawings are indicated by similar reference numerals.

Figures 1, 2, 3:
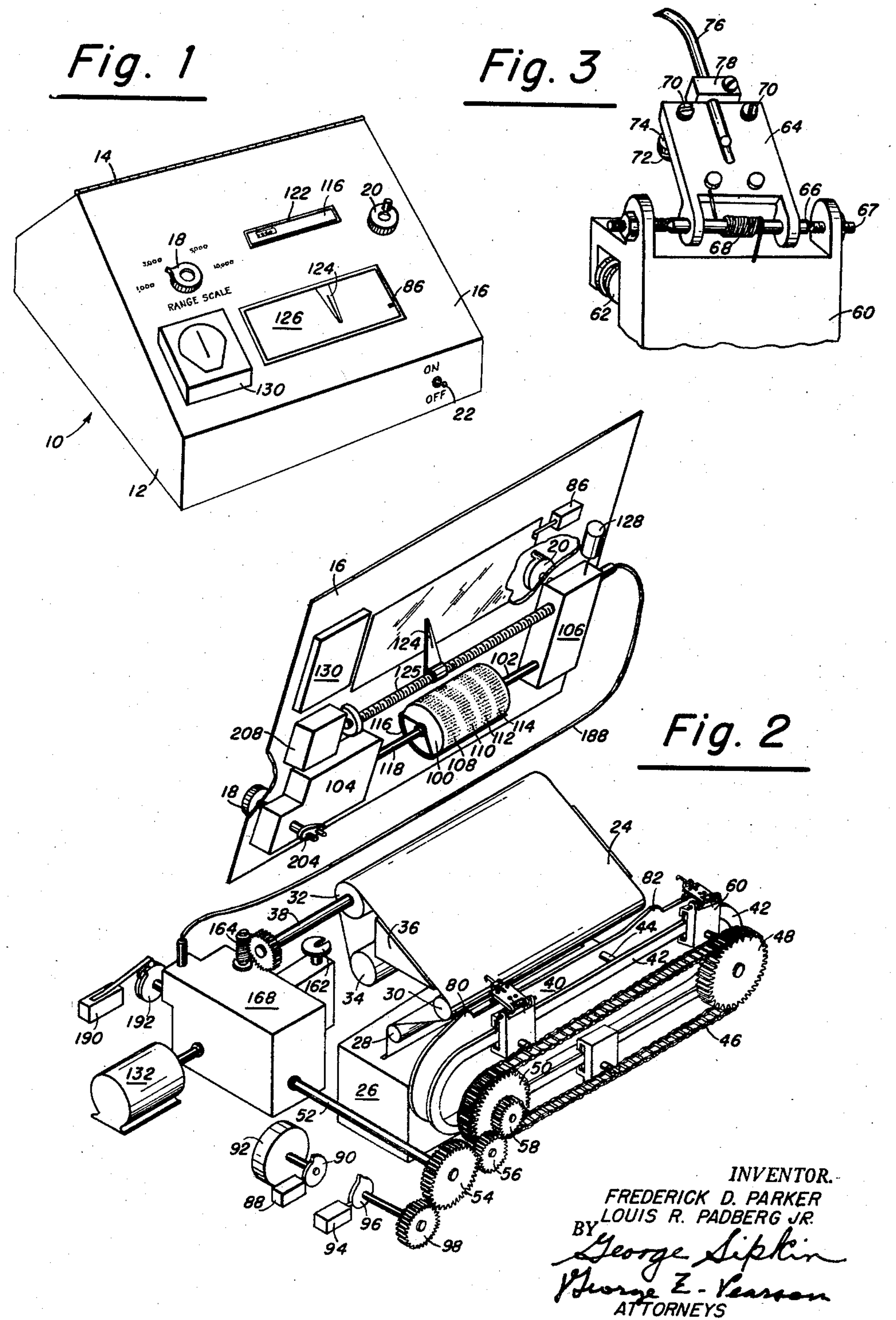
Fig. 1 is a perspective view of the recorder.
Fig. 2 is a schematic illustration of the mechanical features of the recorder.
Fig. 3 is a perspective view of a stylus and part of its carriage.

The recorder cabinet 10 comprises a base enclosure 12 and a closure panel 16 pivoted thereto on hinges 14. The components of the recorder are mounted within the base enclosure and on the closure panel whereby all of the parts except the control knobs 18, 20, power switch control 22 and various external electrical connections to associated equipment are housed within the cabinet.

Referring to Fig. 2, chemically treated recording paper 24 is continuously fed from tank 26 over rolls 28, 30, 32, 34 and paper support 36 by rotation of paper drive shaft 38 which may also be connected by gearing (not shown) to operate take-up roll 34, all mounted in base 12. Also mounted in the base, electrically insulated therefrom and parallel with and adjacent to roll 30 is a guide comprising contact track 40 having carriage track 42 fixed thereto by spacers 44. Endless carrier 46, which may be a silent chain, is entrained over gears 49, 50 journalled in the guide and driven by stylus drive shaft 52 through gears 54, 56, 58, one or more of the latter being formed of non-conductive material such as nylon or the like. A plurality of carriages 60 secured at equal distances to and along carrier 46 carry anti-friction elements 62 which ride on track 42. A stylus support 64 for each carriage has fixed thereto a pivot shaft 66 which is journalled in a pair of axially adjustable screws 67 threaded into the respective carriages. Each stylus support is biased toward the guide by spring 68 to an adjustable limit position determined by the engagement of set screws 70 with contact shoes 72 mounted on the ends of a U-shaped resilient highly conductive follower 74 which is secured at its bight intermediate its ends to the support 64. A recording instrument 76 in the form of a stylus having a fine platinum tip brazed to the body thereof is detachably mounted for axial and rotational adjustment in clamp 78 which is fixed to support 64. The same adjustable and detachable mounting may be effected by threading the stylus into a threaded aperture formed in the support. It will be seen that adjustable set screws 70 limit the minimum distance between shoes 72 and support 64 to provide a stop which limits the spring urged movement of the support toward the guide whereby the pressure of the stylus point on the paper may be simply adjusted and uniformly maintained. Cam 80 fixed to contact track 40 functions to lift the styli over the leading edge of the paper and determines the initial point of contact while a similar cam 82 is positioned on the track to lift the styli from the paper before the trailing edge thereof to provide a blank margin on which the time marks 84 (Fig. 8) are recorded. The time marks are produced at fixed and equal time intervals by stylus 86 secured to panel 16 and energized through switch 88 which is cyclically actuated by cam 90 driven by timing motor 92. Keying switch 94 is actuated as each traversing stylus reaches a predetermined position such as its initial point of contact with the paper. This actuation is effected by cam operator 96 which as shown is rotated by gears 54 and 98 but may be mounted directly on shaft 52. Cam 96 is adjustably mounted on its shaft so that the actuation of switch 94 can be synchronized with the time of initial stylus contact.

A range drum 100 is journalled by means of shaft 102 in gear boxes 104, 106 secured to panel 16 and is marked with a plurality of range scales 108, 110, 112, 114, each of which comprises a set of numbers engraved about the circumference of the drum, such as 0–1000 by 10's, 0–3000 by 30's, 0–5000 by 50's and 0–10,000 by 100's. A mask 116 (Figs 2, 6 and 7) concentric with the drum and mounted on shaft 118 concentric with shaft 102 is provided with a series of stepped openings 120, a selected one of which may be aligned with window 122 of panel 16. Range cursor 124 is threaded on screw 125 for movement along and closely adjacent the styli traverse and may be viewed together with the styli traverse through window 126 of the panel top. Also mounted on the panel top are linear potentiometer 128 and bearing deviation indicator 130 for purposes described below.

Figures 5, 6:
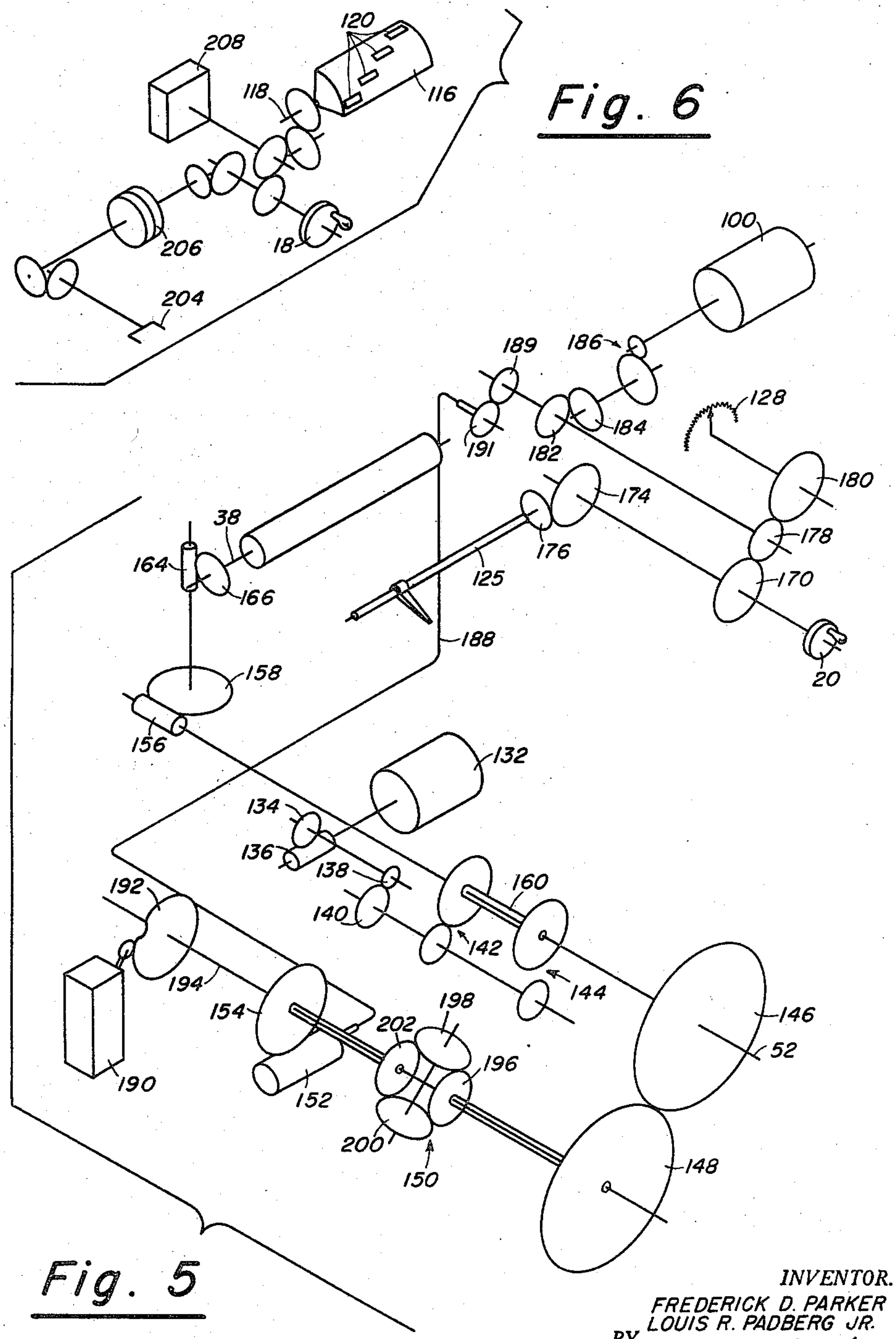
Figs. 5 and 6 are schematic gear diagrams of the recorder mechanism.

Referring now to Fig. 5, synchronous motor 132 drives shaft 52 through gears 134—140 and selectively meshing pairs of shift gears 142, 144. While only two pairs of shift gears are shown it will be understood that there is provided one pair for each range scale. One gear of each pair of shift gears is fixed to axially shiftable shaft 160 which is keyed to shaft 52 and is shifted through mechanism not shown by rotation of shift operator 162 (Fig. 2) whereby the rotational speed of stylus drive shaft 52 may be varied by selective engagement of different pairs of shift gears. Paper drive shaft 38 is driven from shaft 52 through gears 156, 158, 164, 166 which together with gears 50—58 (Fig. 2) determine a fixed ratio of speeds of styli and paper. Gears 134—158 are all mounted within gear box 168 (Fig. 2) carried in base 12.

Range control knob 20 drives screw 125 through gears 170—176 to shift the cursor and simultaneously drives potentiometer 128 through gears 178, 180, drum 100 through gears 182, 184 and intermittent gears 186, and flexible cable 188 through gears 189, 191. Switch 190 is actuated by cam 192 adjustably secured to shaft 194 which may be driven through gears 146, 148 or through cable operated gears 152, 154. This alternative drive is effected through differential 150 which includes a gear 196 fixed to gear 148 and meshing with gears 198, 200 and a gear 202 fixed to gear 154 and meshing with gears 198, 200. Gears 148, 154, 196, and 202 are rotatable relative to shaft 194.

In Figs. 2 and 6 is shown the shift fork 204 which engages shift operator 162 and is driven through coupling 206 and appropriate gearing by rotation of range scale control knob 18. Rotation of knob 18 simultaneously operates rotary switch 208 and turns mask 116 through the gearing shown in Fig. 6.

Figure 7:
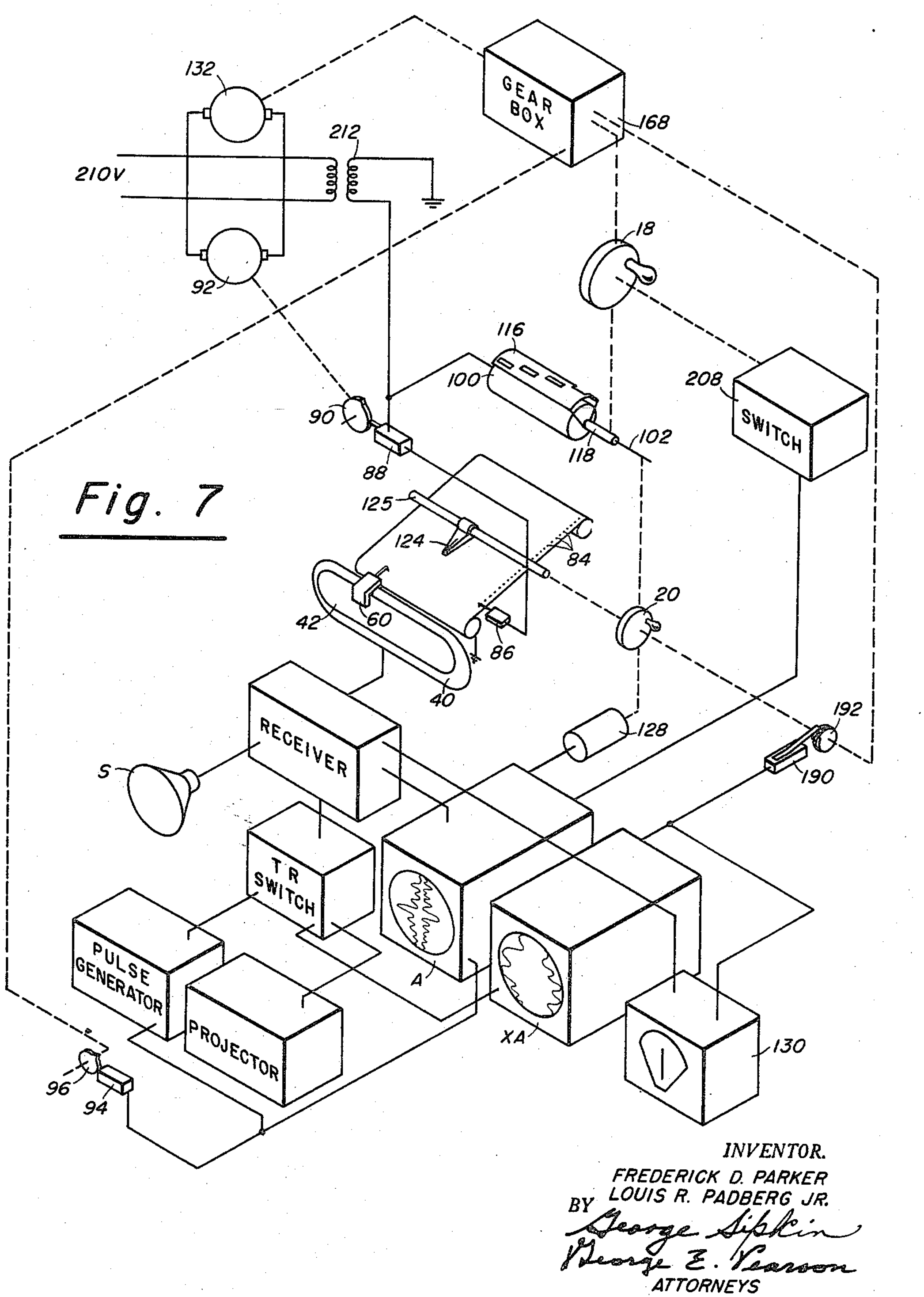
Fig. 7 is a block diagram of one system in which the recorder may be incorporated and showing the relation of certain mechanical components.

An echo ranging system in which the recorder of this invention may be incorporated is schematically depicted in Fig. 7, wherein electrical connections are shown in solid lines and mechanical connections are shown in dotted lines. Electric energy pulses from the pulse generator are fed through the TR switch to a transducer projector which transmits signal pulses of acoustic energy. Echoes of transmitted signals are reflected from objects or media in the path of the signals and are received by the projector and fed through the TR switch to the receiver and to an expanded A-scan oscilloscope XA, and thence applied to a plurality of display devices which may include a speaker S, an A-scan oscilloscope A, a bearing deviation indicator 130 and the recorder which comprises the present invention. The pulse generator and scope A are keyed by switch 94 which is actuated by cam 96 to cause a pulse to be transmitted and a sweep to be initiated each time a stylus initially contacts the recording medium whereby, in the arrangement shown three sweeps occur and three pulses are transmitted for each complete revolution of the chain 46. The receiver feeds the echo signals to the recorder in the form of electric pulses of amplitude which varies in accordance with the distance to the reflecting object or medium and other characteristics thereof. These pulses are fed to contact track 40 and pass through shoes 72, follower 74, support 64, stylus 76, treated paper 24 to grounded paper roll 30. The current passing through the paper produces a permanent record mark thereon for each echo of an intensity which varies in accordance with range and reflecting characteristics of the echo source. Current from source 210 is supplied to motors 92, 132 and a suitable voltage is derived from transformer 212 for operation of timing sylus 86 and a light (not shown) mounted in drum 100. Rotation of cursor control knob 20 varies the output of potentiometer 128 to produce a range indication on scope A in accordance with the range selected by the position of the cursor. Cam 192 causes switch 190 to be open and closed for predetermined parts of each revolution of the cam to gate the display on scope XA whereby the display exists only when the switch is closed. The cam closes the switch at a time corresponding to a range which is a predetermined amount less than the cursor indicated range and opens the switch at a time corresponding to a range which is a predetermined amount greater than the cursor indicated range. The cam is manually adjustable to change the relative times of such opening and closing whereby the length of time during which the switch is closed may be varied. Each stylus cyclically traverses the paper at a frequency determined by the speed of shaft 52. When three styli are used the gearing which drives cam 192 from shaft 52 is selected to rotate the cam and cyclically open and close the switch at the third harmonic of the frequency of traverse of one stylus. In other words the switch is opened and closed three times during one complete revolution of the chain 42 and the closing of the switch is set to occur at a time corresponding to a predetermined position of each stylus relative to the paper. This closing time, and thus the initiation of the expanded display, is varied by operation of control knob 20 which turns gear 154 through gear 152 and flexible cable 188 to turn the cam relative to gears 148, 146 whereby the position of the cursor indicates the range of the center of the expanded display and any desired range area may be selected to be shown on the XA scope. The switch 190 may also be connected with bearing deviation indicator 130 to gate this instrument at the desired range. The bearing deviation indicator is fed from the receiver to indicate the angle between the projected energy beam and a line drawn between the projector and the target or echo source.

The range scale of scope A is controlled and varied in accordance with the selected scale of the recorder and of the drum 100 by rotary switch 208.

The range scale of the recorder is determined solely by the speed of stylus traverse whereby an increase in such speed will limit the record to a smaller maximum target distance and a decrease in stylus speed will permit the recording of echoes received from more distant targets. In order to obtain a uniform spacing of successive stylus traverses such as 48 lines per inch of paper travel the ratio of paper speed to stylus speed must be fixed regardless of the chosen range. Therefore the paper and styli are driven at relatively fixed speeds from a single shaft 52 which maintains the fixed traverse spacing and the rate of movement both of styli and paper is varied by changing the speed of rotation of drive shaft 52. The change in recorder range scale is effected by operation of scale control knob 18 which shifts gears 142, 144 through shift fork 204 and shift operator 162. Movement of knob 18 simultaneously turns shaft 118 of mask 116 to select one of range scales 108—114 through the one mask opening which is aligned with window 122 and operates rotary switch 208.

The range of a particular target which is measured on the record by the distance to the target echo mark from the beginning of a traverse is read directly from the one selected range scale. Knob 20 is turned to move the cursor which provides a visual indication of a selected record or traverse portion and simultaneously rotates range drum 100 to align one range figure of the selected scale with that opening 120 of the mask which may be viewed through window 122 whereby the range of the indicated record portion may be read directly.

Figure 8:
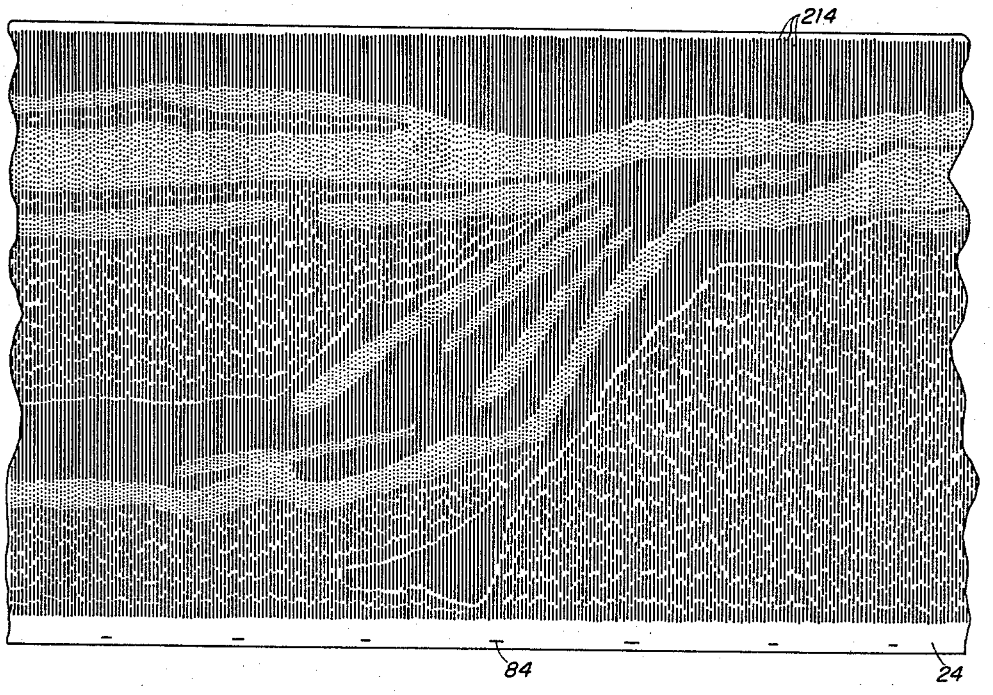
Fig. 8 illustrates a record obtained with the recorder.
Figure 4:
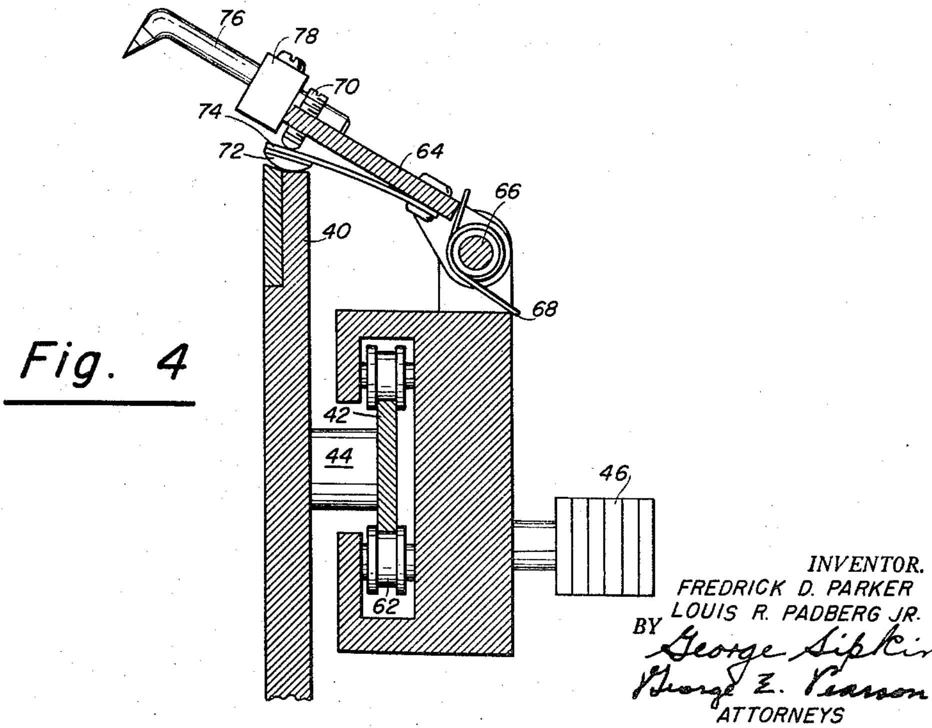
Fig. 4 is a sectional view of a stylus assembly.

As shown in Fig. 8 time marks 84 are equidistant which indicates that the range scale of this record portion was not changed. A shift in range scale would change the physcial spacing of the time marks which are nevertheless equally spaced in time for all range scales. The operator merely writes on the record the time of day at which a single mark is produced whereby the time of production of any portion of the record may be determined simply by counting the time marks. The record produced by traverse of successive styli is indicated by the vertical lines 214, the stylus travel being along such lines from top to bottom of paper 24 when the latter is oriented as in Fig. 8. The solid, dotted, and dashed portions of each record line are convenient drafting techniques to indicate markings of varying intensity but the length of each mark of the sets of marks which comprise one traverse is determined by the duration of the echo signal.

The spacing of the styli on the chain is such that initiation of each traverse is effected immediately upon completion of the preceding traverse whereby lost time (i.e., time of no recording) is minimized. The fine styli points produce a clear sharp record and permit a close spacing of successive traverses such as 48 lines per inch of paper. With such minute spacing a step-by-step paper movement is unnecessary since the ends of one record line will be relatively shifted only 1/48 inch, a negligible amount.

As alternative methods of construction it is contemplated that the cursor could be replaced by a light source which would reflect a fine line of light on the paper at desired range and the marked range drum may be replaced by an automatic revolution counter. The shifting of gears might be effected by electrical means incorporating a magnetic clutch while the type of recording paper and number of range scales may be chosen for suitability to the particular use of the apparatus.

Obviously many modifications and variations of the present invention are possible in the light of the above teachings. It is therefore to be understood that within the scope of the appended claims the invention may be practiced otherwise than as specifically described.

What is claimed is:

1. In an echo ranging system wherein echoes of transmitted signals are fed to a plurality of display devices, a recording medium movable in one direction, a recording instrument, a carrier mounting said instrument for movement over said medium in a direction transverse to the motion of said medium, driving means for moving said medium and said instrument at relatively fixed speeds, means mounted independently of said carrier and coupled with said driving means for keying the transmitted signals, a plurality of range scales, means for changing the speed of said driving means, switch means for controlling the range scale of an associated display device, control means for simultaneously selecting one of said range scales and operating both said speed changing means and said switch means, a movable cursor, means coupled with said cursor controlling an associated display device at a range corresponding to the position of said cursor and for simultaneously indicating a corresponding range on said selected range scale, and means for indicating on said medium the time of traverse of said instrument.

2. In an echo ranging system wherein echoes of transmitted signals are fed to a plurality of display devices, a recording medium movable in one direction, a recording instrument, a carrier mounting said instrument for movement over said medium in a direction transverse to the motion of said medium, driving means for moving said medium and said instrument at a fixed ratio of predetermined speeds, means mounted independently of said carrier and coupled with said driving means for keying the transmitted signals, a plurality of visual range scales, selector means for selectively displaying one of said scales, means for changing the speed of said driving means, switch means for controlling the range scale of an associated display device, and control means for simultaneously operating said selector means, said speed changing means and said switch means.

3. A recording system comprising a recording medium, a carrier, a plurality of recording instruments mounted on said carrier, drive means for moving said medium at a first speed in one direction and for moving said carrier and instrument across said medium in a direction transverse to said one direction and at a speed fixed relative to said first speed, first switch means mounted independently of said carrier and coupled with said drive means for actuation at predetermined positions of said instruments, a plurality of range scales, means for changing the speed of said driving means, second switch means, control means for simultaneously indicating one of said scales and actuating both said speed changing means and said second switch means, third switch means, adjustable operator means for actuating said third switch means at predetermined positions of said instruments, a potentiometer, a cursor mounted for movement adjacent and parallel to said medium, control means for moving said cursor and for simultaneously effecting adjustment of said operator means, of said potentiometer, and of said one indicated scale, and means for indicating equal time intervals of said medium regardless of the speed thereof.

4. A recording system comprising a recording medium, a carrier, a recording instrument mounted on said carrier, drive means for moving said medium at a first speed in one direction and for moving said carrier and instrument across said medium in a direction transverse to said one direction and at a speed fixed relative to said first speed, first switch means, a first cam mounted independently of said carrier and coupled with said drive means for actuating said switch means at a predetermined position of said instrument, a range scale, second switch means, adjustable operator means for actuating said second switch means at a predetermined position of said instrument, a potentiometer, a cursor mounted for movement adjacent and parallel to said instrument, and means responsive to movement of said cursor for simultaneously effecting adjustment of said operator means, of said potentiometer, and of said scale.

5. In a recording system of the type disclosed, guide means, a carriage movably mounted on said guide means, a stylus support, a shaft fixed to said support and journalled in said carriage, means for axially shifting said shaft relative to said carriage, means biasing said support toward said guide means, stop means for limiting movement of said support toward said guide means, and a stylus adjustably mounted on said support.

6. In a recording system of the type disclosed, a carriage, a stylus support, means shiftably mounting said support on said carriage, means biasing said support relative to said carriage, a resilient element secured intermediate its ends to said support, a contact shoe on each end of said element, adjustable stop means connected between said shoes and said support, an elongated stylus, and means mounting said stylus on said support for axial adjustment.

References Cited in the file of this patent

UNITED STATES PATENTS

| | | |
|---|---|---|
| 920,487 | Murphy | May 4, 1909 |
| 1,666,330 | Ferree et al. | Apr. 17, 1928 |
| 2,082,109 | Hunt | June 1, 1937 |
| 2,268,808 | Davis | Jan. 6, 1942 |

| | | |
|---|---|---|
| 2,309,956 | Hughes | Feb. 2, 1943 |
| 2,384,515 | Wise | Sept. 11, 1945 |
| 2,489,997 | Anderson | Nov. 29, 1949 |
| 2,584,149 | Moffitt et al. | Feb. 5, 1952 |
| 2,598,541 | Hill | May 27, 1952 |
| 2,637,619 | Stein | May 5, 1953 |
| 2,710,787 | Witt | June 14, 1955 |
| 2,715,055 | Fryklund | Aug. 9, 1955 |
| 2,722,470 | Witt | Nov. 1, 1955 |

FOREIGN PATENTS

| | | |
|---|---|---|
| 245,410 | Sweden | July 16, 1947 |